United States Patent [19]

Aquino et al.

[11] Patent Number: 4,940,130

[45] Date of Patent: Jul. 10, 1990

[54] METHOD OF CONTROLLING THE FLOW OF BAKERY AND OTHER ITEMS

[75] Inventors: Agostino Aquino, Patterson, N.J.; Karl U. Lang, Port Jarvis, N.Y.

[73] Assignee: Nabisco Brands, Inc., East Hanover, N.J.

[21] Appl. No.: 277,768

[22] Filed: Nov. 30, 1988

[51] Int. Cl.⁵ .................................. B65G 47/52
[52] U.S. Cl. ................................. 198/432; 198/434
[58] Field of Search ........... 198/432, 434, 459, 463.4, 198/464.2, 418, 450, 457, 481.1, 433

[56] References Cited

U.S. PATENT DOCUMENTS

| | | | |
|---|---|---|---|
| 2,478,465 | 8/1949 | Dodson | 198/481.1 X |
| 3,084,783 | 4/1963 | Morton et al. | 198/450 |
| 3,187,873 | 6/1965 | Wolff | 198/434 X |
| 3,308,922 | 3/1967 | Ellis et al. | 198/433 |
| 3,429,416 | 2/1969 | Provost et al. | 198/433 |
| 3,556,280 | 1/1971 | Schnee et al. | 198/31 |
| 3,614,924 | 10/1971 | Hickey | 198/481.1 X |
| 3,786,617 | 1/1974 | Fluck | 53/154 |
| 3,812,647 | 5/1974 | Bertling et al. | 53/62 |
| 3,830,360 | 8/1974 | Graff et al. | 198/457 X |
| 3,884,343 | 5/1975 | Stephens et al. | 198/433 |
| 4,238,025 | 12/1980 | Manservisi | 198/450 |
| 4,261,456 | 4/1981 | Scarpa et al. | 198/481.1 X |
| 4,413,462 | 11/1983 | Rose | 53/540 |
| 4,463,291 | 8/1969 | Cummings | 198/433 |

FOREIGN PATENT DOCUMENTS 0119620 9/1980 Japan ................................. 198/450

Primary Examiner—Robert J. Spar
Assistant Examiner—James R. Bidwell

[57] ABSTRACT

There is set forth a rotating wheel transfer mechanism for transferring items, but in particular bakery items, from one conveyor belt to another conveyor belt. Combined with the conveyor belt mechanism there can be a gate arrangement to assist in aligning the conveyed items. In addition, the wheel transfer mechanism can be heated or cooled in order to respectively heat or cool the items being conveyed. The net result is that the items can be transferred from one conveyor belt to another conveyor belt with less damage to the particular items.

31 Claims, 2 Drawing Sheets

METHOD OF CONTROLLING THE FLOW OF BAKERY AND OTHER ITEMS

BACKGROUND OF THE INVENTION

This invention relates to a method and apparatus for controlling the flow of bakery and other items in a manufacturing process. More particularly, this invention relates to a method and apparatus that can be utilized to transfer bakery and other items from one conveyor to another and to align bakery and other items on conveyors in order to facilitate faster processing or the packaging of such items.

In many instances before an item can undergo further processing or be packaged, it must be brought into a particular alignment. This is the case with regard to many different items. This is particularly the case with regard to bakery items, and more particularly with regard to fragile bakery items. Various fragile bakery goods which will include various types of cookies, must be carefully handled and packaged so that the cookies will not be damaged and will be maintained in a separated condition. Such items need this type of packaging since if packaged in a random fashion the cookies would either become broken, marred in some manner, or if they contain a delicate or multiple coating, could become bonded one to the other. There is therefore a continuing need in the bakery art for specialized handling equipment for various types of products.

The present invention is directed to a method and apparatus for controlling the flow of items, and in particular bakery items, which are being fed to a packaging or some other operating point. The items could be aligned prior to being fed to an enrobing operation, or prior to being fed to a packaging operation. In any regards, one objective is to put the various items into an alignment so that they can be fed in an orderly and controlled manner. This is necessary in many operating sequences.

The present invention also provides a convenient technique for transferring items from one conveyor belt to another conveyor belt. Further, the conveyor belts need not be in the same plane. The technique is also gentle with regard to the item being transferred to thereby minimize damage to any of the items.

Various techniques have been utilized for the alignment of items, including bakery items. In some cases the apparatus consists of a gate mechanism which is controlled by either a mechanical switch means or a photoelectric switch means. In such cases, when there are a number of items on a conveyor and adjacent to the gate mechanism the gate mechanism is opened and permits a row of such items to move forward along a conveyor belt. In such equipment and methods, the various items will move forward on the same conveyor belt or will be allowed to move onto another conveyor belt which is adjacent to the gate mechanism. There are yet other types of apparatus that have been utilized for similar purposes. For instance, in U.S. Pat. No. 3,556,280 there is disclosed an apparatus for placing articles in rows on a conveyor. The conveyor belt receives the articles at one end and delivers them to the other end. At the other end a number of the articles are removed from the conveyor belt and are dropped downwardly onto a further transporting medium. This second transporting medium is transverse to the conveyor. However, there is not disclosed in this patent a technique of utilizing a rotatable wheel mechanism as a means to align a particular number of items.

In U.S. Pat. No. 3,786,617 there is disclosed a device for the automatic filling of biscuits into packaging containers. In this patent there is disclosed a chute which contains a plurality of cookies which move downwardly through the chute. A given number of the cookies are released from the chute and moved downwardly onto a supporting surface. Once on the supporting surface, the given number of cookies are moved transversely over to a tray where the cookies are slid into the tray. As the trays are filled they move downwardly and complete the packaging sequence.

U.S. Pat. No. 3,812,647 discloses an apparatus for stacking and packaging food products. This apparatus is particularly adapted for round disc-shaped articles such as cookies. In this apparatus the cookies move in a single file along a series of conveyor belts. The cookies at the end of the conveyor belt are stacked to a given number. They are then moved forwardly onto a rotating table which moves the cookies around to a point where they will be slid onto a packaging tray.

U.S. Pat. No. 4,413,462 discloses an accumulator and stacker for sandwich cookies, biscuits and similar articles In this mechanism cookies are accumulated and stacked one on top of the other. These individual two-high stacks can then be further stacked to increase the size of the stack prior to packaging. This patent discloses an interesting conveyor arrangement, however there is no disclosure in this patent, or in the other above-cited patents, with regard to the use of a rotatable wheel having longitudinal slots in order to move articles from one conveyor to another, or to arrange items, including cookies, biscuits and the like, for further processing or packaging by putting them in a particular alignment.

BRIEF SUMMARY OF THE INVENTION

The present invention is directed to a method and apparatus for controlling the flow of items along a conveyor belt system. In particular, the present method and apparatus is directed to transferring articles from one conveyor belt to another or to aligning articles that are in a number of rows so that the articles will move transversely in a row along a conveyor belt mechanism. The apparatus consists of two conveyor belts. In between the conveyor belts is a rotating wheel having a plurality of longitudinal slots. Also, in a preferred embodiment, the conveyor belts have multiple lanes and at the end of the conveyor belt which delivers the items to the rotatable wheel, there may be a gate mechanism which opens when there is an item in each lane of the conveyor belt. That is, at the gate mechanism, it is sensed when there is an item in the area of the gate in each lane whereby when the gate opens one item from each lane passes onto the rotatable wheel and via the rotatable wheel is deposited downwardly onto the second conveyor belt mechanism. The articles will under the influence of gravity slide off the rotating wheel and advance along the second conveyor belt in a transverse alignment. Such an alignment is important with regard to packaging operations. A gate mechanism at the end of the conveyor which delivers the items to the rotatable wheel can be operated by means of an electro-mechanical mechanism or a photo electric mechanism.

The method of the present invention in its preferred embodiment consists of flowing items from an oven, an enrobing machine or some other device into individual lanes of a first conveyor. This first conveyor moves the items along in a disparate arrangement from the entry end to the exit end which is in the region of the rotatable wheel. At the exit end the items are deposited onto a longitudinal slot of a rotating wheel. The rotating wheel takes the items and under the influence of gravity permits the items to slide from the rotatable wheel onto a second conveyor mechanism. On the second conveyor mechanism the items will now be in a transverse alignment to the conveyor belt. These items are then moved along at a desired rate for further processing or to a packaging station.

DETAILED DESCRIPTION OF THE INVENTION

There is a need in many processes to transfer items in a careful manner from one conveyor belt to another conveyor belt. There is also a need in many operations, and particularly in packaging operations, to align a number of articles traveling along a conveyor belt so that these items can be packaged in an orderly manner. The technique that has been devised in order to meet these objectives, as well as other objectives, consists of utilizing a rotating wheel having longitudinal slots therein for carrying the particular items and for receiving the items from one conveyor belt mechanism and to deposit the items onto the second conveyor belt mechanism. In this way, there is a positive flow of the items from one conveyor belt to another conveyor belt.

The present mechanism is particularly advantageous when used in combination with a gate mechanism just prior to the rotating wheel. In this way the gate mechanism will fill each longitudinal slot of the rotating wheel with the items to be conveyed to the second conveyor belt. These items are then deposited onto the second conveyor belt in an aligned row. The items can then be sent to further processing such as coating or enrobing, or they can be forwarded to packaging. Regardless of the situation in which it is used, the rotating wheel mechanism will deposit the items in a manner in which the items undergo a minimum amount of potential damage.

The present invention will be described for particular use with bakery products. However, it is to be recognized that it can be utilized with essentially any situation where a plurality of articles are being conveyed.

Figure 1:
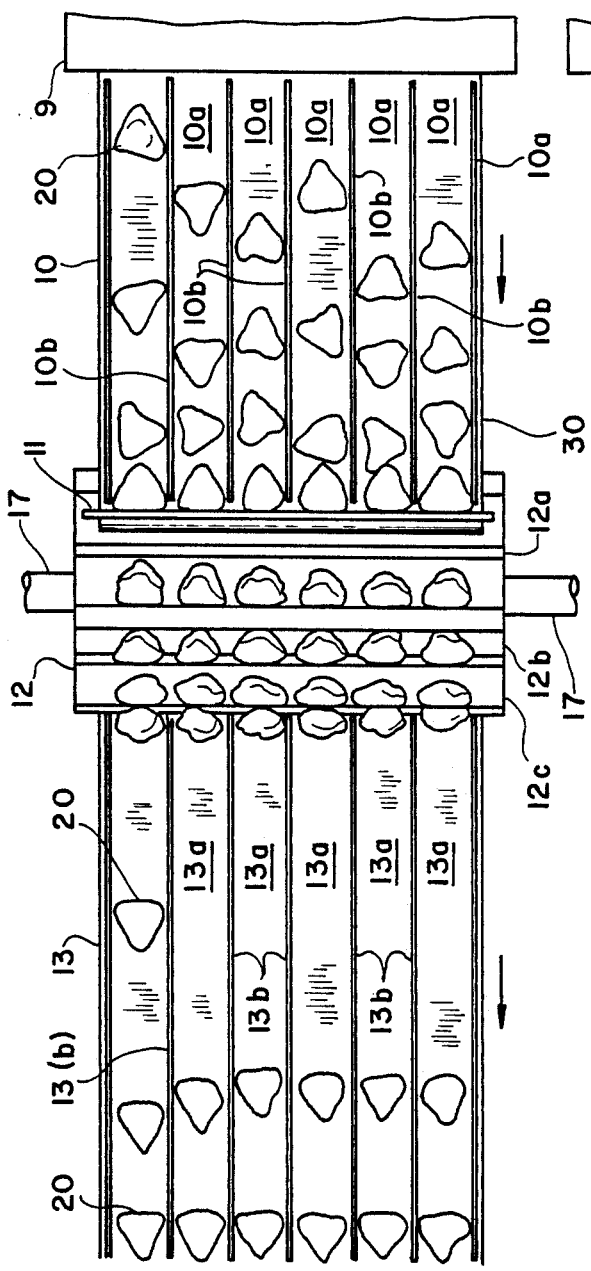
FIG. 1 is a top plan view of the present apparatus showing the conveyor belt delivering items to the rotatable wheel and a second conveyor belt transporting items from the rotatable wheel.
Figure 2:
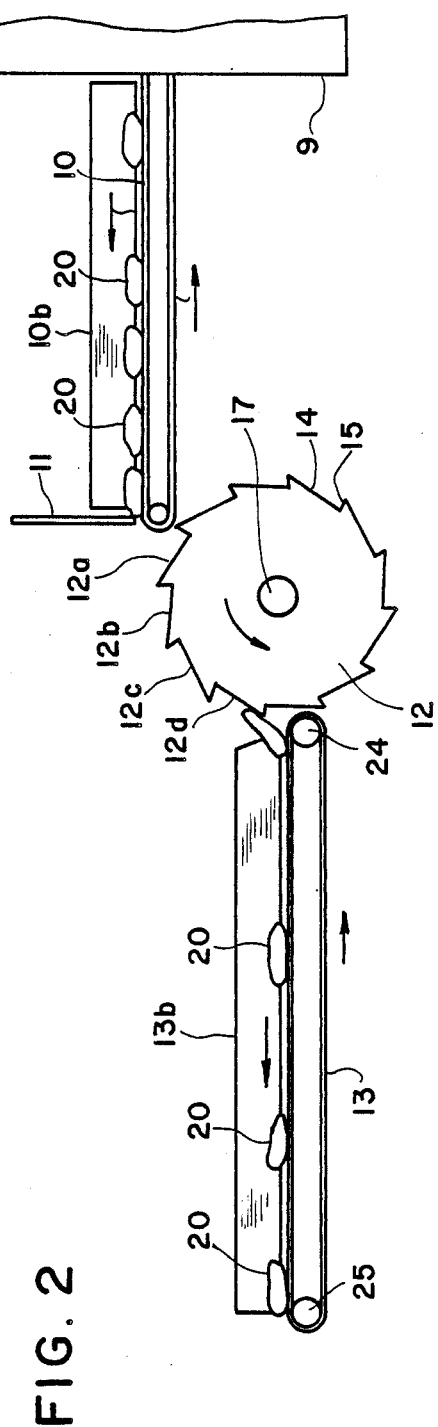
FIG. 2 is an elevational view of the apparatus of FIG. 1.

In more detail and with specific reference to FIG. 1, the various articles 20 exit an oven 9 or a device which has conducted some other operation on the various bakery items 20. These bakery items 20 are deposited onto conveyor belt 10 which consists of lanes 10a separated by vertical separators 10b. In this embodiment it is shown that the conveyor belt 10 delivers the items 20 to the area of gate 11. At gate 11 when there is an item 20 in each lane adjacent to the gate, the gate opens and permits a row of items 20 to be deposited onto a drum or rotating wheel 12 which rotates on axis 17. Rotating wheel 12 has a plurality of peripheral grooves or longitudinal slots designated 12a, 12b, 12c, 12d, and so on. The number of longitudinal slots will range from 2 to about 24. However, it is to be recognized that there is no limitation on the number of longitudinal slots. The number of longitudinal slots will be governed by the circumference of the wheel and the size of the items 20 that are being conveyed. As wheel 12 rotates, the items 20 fall or slide from the peripheral grooves and are deposited down onto the conveyor belt mechanism 13. As seen in FIG. 2, the items 20 slide down and bridge the distance or gap between the rotating drum 12 and the conveyor 13. Conveyor belt 13 consists of a plurality of lanes 13a separated by vertical projections 13b. The items move along conveyor belt 13 in an aligned row. These items are delivered by conveyor 13 to a further processing step or to packaging.

FIG. 2 is an elevational view of the device of FIG. 1. This view shows the rotating wheel in more detail. In this view there is shown a wheel which has 12 peripheral steps These peripheral steps each have a bottom portion 14 and a ledge or raised portion 15. Bottom portion 14 supports the item as it is rotated by the wheel and raised portion 15 catches and maintains the item in that particular peripheral step. An item exiting end of the conveyor belt 10 is positioned adjacent to the side of the drum 12 rotating upwardly. As shown in FIG. 2, the exiting end of the conveyor belt is positioned just below the highest point of rotation of the drum 12. An item receiving end of the belt conveyor 13 is positioned adjacent to the side of the drum 12 rotating downwardly. As also shown in FIG. 2, the receiving end of the conveyor is positioned approximately at the center of rotation of the drum 12.

When a gate 11 is incorporated into a system it converts the conveyor 10 into an accumulator mechanism. The function of an accumulator mechanism is to accumulate an item in each lane of the conveyor prior to the gate's opening. The gate then opens and permits one or more of the items in each row to proceed forwardly. In the present case when the gate 11 opens it permits one item to go forward and to fall into a longitudinal slot on wheel 12. In such an instance the gate 11 must have some manner of detecting when there is an item in each lane adjacent to the gate. In this regard this gate can be actuated either electro-mechanically or photo-electrically.

Figure 3:
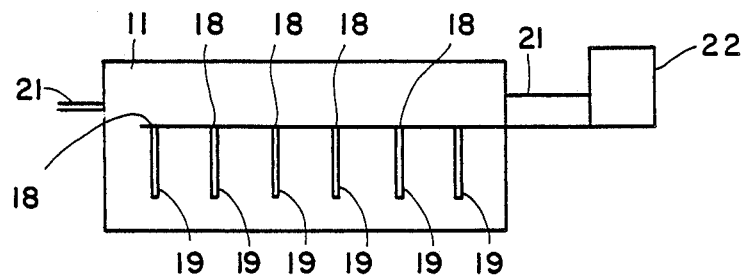
FIG. 3 shows a mechanical sensing mechanism for sensing when an item is in a lane of the first conveyor and adjacent to the gate.
Figure 4:
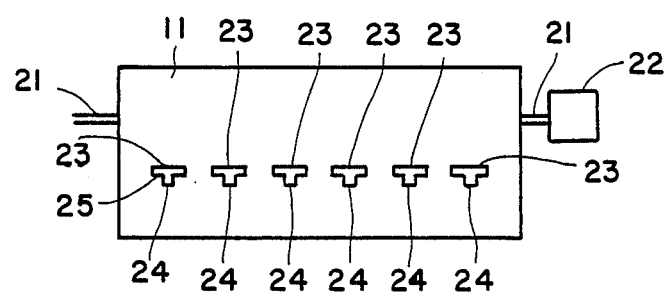
FIG. 4 shows a photo-electric controlled mechanism which senses when an item is adjacent to the gate at the end of the first conveyor belt and adjacent to the rotatable wheel.

In FIG. 3, there is illustrated an electro-mechanical arrangement for the operation of gate 11. In this Figure, gate 11 is supported on rods 21 on which it can pivot. It will pivot by means of an actuating motor connected to either rod 21. The mechanism for sensing whether there is an item in a row consists of electro-mechanical switch 18 which has depending therefrom a spring loaded arm 19. When an item in a lane contacts a spring loaded arm 19, it closes the switch 18. When the switches 18 are connected in series, there will not be a continuous circuit from the individual switches 1B through to a motor to actuate the rod 21 until there is an item in each lane pressing against the arms 19. Once this occurs, each of the switches is closed to thereby close the circuit. That is, when each switch 18 is closed, power can be actuated to flow to motor 22 and open the gate 11. In FIG. 4, there is shown a similar arrangement but wherein there is utilized a diode and photocell arrangement 25 in place of the electro-mechanical arrangement for sensing when an item is within a particular lane and adjacent the gate. Here diode 24 provides light that is reflected and sensed by photo-electric unit 23. The photo-electric units 23 can be connected in a series arrangement, and when there is an item in each lane, this is sensed photo-electrically and the motor 22 actuates the gate 11 to permit a row of articles to proceed.

When a photo-electric mechanism is used, it will sense the reflectivity of the base conveyor mechanism and the reflectivity of the items supported on the conveyor belt. The reflectivity will be different for each. Thus, when the reflectivity is in the range of that for a conveyed item, the particular switch closes to indicate an item in that lane. When all of the photo-electric switches are closed, this permits a current to flow and to actuate motor 22 to operate gate 11. In construction the diode 24 is surrounded by photo-electric cell 23 to determine the reflectivity of the light emitted from diode 24.

Besides electro-mechanical and photo-electric techniques for operating such a gate, there are various other ways that a gate can be operated if one is to be used. As a for instance, the accumulator and the gate mechanisms which are disclosed in U.S. Pat. No. 4,662,152 could be utilized in the present instance In this regard that part of U.S. Pat. No. 4,662,152 is hereby incorporated by reference.

It is not necessary that there be a gate 11 in the conveyor system. In such an instance the wheel 12 will be utilized as a means for transferring items from one conveyor belt mechanism to another conveyor belt mechanism. This provides a convenient technique for carefully moving items, and in particular baked items, from one conveyor belt to another conveyor belt. This assures that the items that are being transported on the conveyor belt will not be damaged by the roller at the end of the first conveyor belt or by the roller at the beginning of the second conveyor belt.

Figure 5:
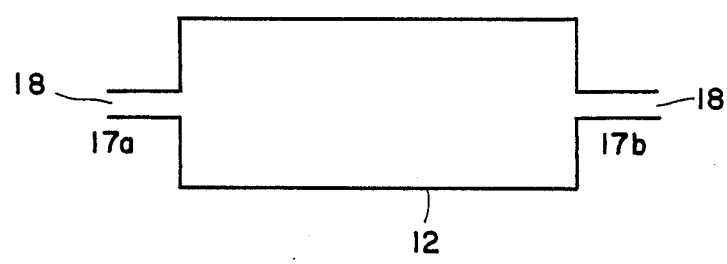
FIG. 5 is a sectional view of the rotatable wheel showing it in addition as a heating or cooling means.

Further, the wheel can be cooled or heated on the interior by means of water or some other fluid or by a gas so as to cool or heat the bottom surface of the item while it is transferring it from one conveyor belt to another conveyor belt. In this way, if it were cooling the item, it would be making the item, such as a cookie, more stable for transport through successive operations. In order to utilize the wheel 12 as a cooling or heating mechanism, all that is necessary is that cold or hot water or other fluid, including cold or hot gases, be flowed in one support rod 17, allowed to permeate throughout the interior of the wheel, and then exit the other support rod 17. In such an instance, each end of the rod 17 would be bored through this center as shown in FIG. 5. In FIG. 5 the rods 17 are shown as 17a and 17b. These rods are centered and support the wheel as it rotates. Each rod has a bore 18 which is open to the hollow center 19 of the wheel. In use a heating or cooling fluid can be flowed in either rod 17a or 17b. It will then exit the opposite end. Inside wheel 19 there can be baffles or other means to control the flow of the heating or cooling fluid. Other adaptations could also be made to increase the effectiveness of the wheel as a heating or cooling device.

There are yet other uses to which this wheel transferring mechanism can be utilized. However, such uses based on the present disclosure would be within the skill of one in the art.

We claim:

1. A method of controlling the flow of items in a conveyor system, comprising:

conveying said items by a first conveyor having a plurality of lanes to a rotating drum positioned transversely relative to said first conveyor and having a plurality of longitudinal transverse peripheral grooves with ledge portions;

holding said items at an end of each lane of said first conveyor until there is positioned an item in each lane to define a transverse row of items;

releasing and transferring the transverse row of items to said rotating drum so that said items are caught by said ledge portions as the grooves are being rotated upwardly as the drum rotates;

rotating said drum to a position at which said items can be removed from said grooves; and depositing said items from said grooves onto a second conveyor.

2. A method as in claim 1 wherein said second conveyor contains the same number of lanes as said first conveyor.

3. A method as in claim 1 wherein said rotating drum is cooled thereby cooling said conveyed items.

4. A method as in claim 1 wherein said wheel is heated thereby heating said conveyed items.

5. A method as in claim 1 wherein said items are bakery items.

6. A method as in claim 5 wherein said bakery items are cookies.

7. A method as in claim 1, wherein said second conveyor is a belt conveyor.

8. A method as in claim 1, wherein said second belt conveyor is located in close proximity to said rotating drum to facilitate removal of said items from said drum.

9. A method as in claim 1, wherein said items are conveyed to said rotating drum by a belt conveyor.

10. An apparatus for controlling the flow of items in a conveyor system, comprising a rotating drum;

a first with conveyor or with a plurality of lanes having an item receiving end and an item exiting end;

holding said items at an end of each lane of said first conveyor until there is positioned an item in each lane so as to define a transverse row of items; releasing and transferring said transverse row of items to said rotating drum;

said rotating drum positioned transversely relative to said first conveyor and having a plurality of longitudinal transverse peripheral grooves with ledge portions, which ledge portions are exposed upwardly as the grooves are rotated upwardly and are positioned adjacented to the item exiting end of said first conveyor, said first conveyor being positioned so that said items are caught by said ledge portions as the grooves are being rotated upwardly as the drum rotates; and a second conveyor having an item receiving end and an item exiting end, said item receiving end of said second conveyor being positioned adjacent to said rotating drum.

11. An apparatus as in claim 10 wherein said second conveyor has a plurality of lanes.

12. An apparatus as in claim 10 wherein said rotating drum has from about 2 to 24 longitudinal slots.

13. An apparatus as in claim 10 wherein the item receiving end of said first conveyor is positioned adjacent to an oven.

14. An apparatus as in claim 10 wherein at the item exit end of said first conveyor said items are selectively released in transverse rows to said rotating drum.

15. An apparatus as in claim 14 wherein said means to selectively release said items is a gate.

16. An apparatus as in claim 15 wherein there are means to sense an item in each lane of said first conveyor and to operate said gate.

17. An apparatus as in claim 16 wherein said means to sense an item in each lane is an electro-mechanical means.

18. An apparatus as in claim 16 wherein said means to sense an item in each lane is a photoelectric means.

19. An apparatus as in claim 10 wherein there are means to cool said rotating drum.

20. An apparatus as in claim 10 wherein there are means to heat said rotating drum.

21. An apparatus as in claim 10, wherein said plurality of peripheral grooves are defined as steps.

22. An apparatus as in claim 10, wherein the item exiting end of said first conveyor is located at a position below the highest point of rotation of said drum on the side of the drum rotating upwardly.

23. An apparatus as in claim 22, wherein the item exiting end of said first conveyor is located at a position just below the highest point of rotation of said drum.

24. An apparatus as in claim 10, wherein the item receiving end of said second conveyor is located on the side of the drum rotating downwardly.

25. An apparatus as in claim 10, wherein the item receiving end of said second conveyor is located at a position to receive items falling from the grooves of said drum.

26. An apparatus as in claim 24, wherein the item receiving end of said second conveyor is located at a position below the highest point of rotating of said drum.

27. An apparatus as in claim 21, wherein the item receiving end of said second conveyor is located at a position to receive items sliding from the grooves of said drum.

28. An apparatus as in claim 26, wherein the item receiving end of said second conveyor is located at approximately the same height as the center of rotation of said drum.

29. An apparatus as in claim 21, wherein the item receiving end of said second conveyor is located so that the items can bridge between the steps and second conveyor during the transfer from said rotating conveyor to the second drum.

30. An apparatus according to claim 10, wherein said first conveyor is a belt conveyor.

31. An apparatus according to claim 10, wherein said second conveyor is a belt conveyor.

* * * * *